United States Patent [19]

Walker et al.

[11] Patent Number: 4,537,759
[45] Date of Patent: Aug. 27, 1985

[54] PRODUCTION OF ELEMENTAL SILICON FROM IMPURE SILANE FEED

[75] Inventors: Joe M. Walker, Pittsburg, Kans.; Thomas M. Potts, Miami, Okla.

[73] Assignee: Eagle-Picher Industries, Inc., Cincinnati, Ohio

[21] Appl. No.: 507,768

[22] Filed: Jun. 27, 1983

Related U.S. Application Data

[63] Continuation-in-part of Ser. No. 295,654, Aug. 24, 1981, abandoned.

[51] Int. Cl.³ .............................................. C01B 33/02
[52] U.S. Cl. .................................. 423/349; 423/347; 55/67
[58] Field of Search ..................... 423/347, 349; 55/67

[56] References Cited

U.S. PATENT DOCUMENTS

| | | |
|---|---|---|
| 3,019,087 | 1/1962 | Jacob et al. |
| 3,041,141 | 6/1962 | Shoemaker et al. |
| 3,250,058 | 5/1966 | Baddour |
| 3,352,089 | 11/1967 | Modell et al. |
| 3,357,157 | 12/1967 | O'Donnell |
| 3,374,606 | 3/1968 | Baddour |
| 3,374,607 | 3/1968 | Fisher et al. |
| 3,407,573 | 10/1968 | Crowley |
| 3,422,605 | 1/1969 | Crowley |
| 3,436,897 | 4/1969 | Crowley |
| 3,445,817 | 7/1969 | Modell |
| 3,453,811 | 7/1969 | Crowley |
| 3,488,574 | 11/1969 | Modell |
| 3,491,512 | 1/1970 | Timmins et al. |
| 3,491,517 | 1/1970 | Gerhold |
| 3,494,103 | 2/1970 | Mir |
| 3,675,179 | 7/1972 | Bokros |
| 3,751,966 | 8/1973 | Ryan et al. |
| 3,969,130 | 7/1976 | Bokros |

FOREIGN PATENT DOCUMENTS

| | | | |
|---|---|---|---|
| 73637 | 3/1983 | European Pat. Off. | 423/349 |
| 2172886 | 10/1973 | France | |
| 871614 | 6/1961 | United Kingdom | 423/347 |

OTHER PUBLICATIONS

*Chemical Engineering*, Mar. 24, 1980, pp. 70-72 "Gas Chromatography-Analysis to Production".
*Analytical Chemistry*, 52, 448A (1980) "Production-Scale GC Developed".

*Primary Examiner*—William R. Dixon, Jr.
*Assistant Examiner*—Steven Capella
*Attorney, Agent, or Firm*—Wood, Herron & Evans

[57] ABSTRACT

Elemental silicon is produced by a process and apparatus wherein relatively impure silane ($SiH_4$) is purified in the gaseous state, while mixed with an inert carrier gas, to a content of electronically active impurities which is no higher than that of "electronic grade" silicon. The silane so purified is then thermally decomposed to form elemental silicon of electronic grade purity, without need for further purification of the elemental silicon itself. The silane purification is carried out by injecting the impure silane gas as a series of timed, spaced pulses into a carrier gas stream which transports the silane pulses to a gas chromatographic column, through which the pulses flow in sequence. The column has a porous polymer or a molecular sieve packing which is specially preconditioned to achieve high resolution separation of the components of the feed. The components of each pulse are differentially retarded by this packing so that they move through the column at different rates, as a result of which they exit at different but precisely spaced time intervals in relation to pulse input time. The emergence from the column of the silane "peak" or portion of the respective pulse is detected individually or is timed from the pulse input. When detected or timed, the eluent silane peak and admixed carrier gas are valved to a receiver separately from the other components, which exit before and after that peak. The silane gas fraction of the peak is then thermally decomposed, to form elemental silicon which is of electronic purity, or it may be collected and pressurized before thermal decomposition. The admixed carrier gas is not decomposed, remains a gas, and thereby is separated from the silicon. Depending on the extent to which the gas purification is carried, the product silicon may have a measured resistivity of about 1500 ohms cm or better, and can be used in fabrication of solar cells or semiconductor device without further purification.

11 Claims, 5 Drawing Figures

PRODUCTION OF ELEMENTAL SILICON FROM IMPURE SILANE FEED

This application is a continuation-in-part of co-pending application Ser. No. 295,654, filed Aug. 24, 1981 abandoned.

FIELD OF THE INVENTION

This invention relates to the production of high purity elemental silicon from an impure thermally decomposable silicon compound, without the need to zone refine or otherwise purify the elemental silicon once formed.

BACKGROUND OF THE INVENTION

The fabrication of semiconductor devices is at present generally agreed to require silicon of at least the following purity:

TABLE I

| Purity Requirements For Polysilicon[a] | |
|---|---|
| Electronically active impurity | Parts per billion atomic |
| Group III elements (B, Al, etc.) | Less than 0.3 |
| Group V elements (P, As, etc.) | Less than 1.5 |
| Heavy metals | Less than 0.1[b] |
| Carbon | Less than 300[c] |
| Oxygen | Less than 50[c] |
| All others | Less than 0.001[b] |

[a] See Proceedings of 3rd International Symposium on Silicon Materials, Science & Technology, Vol. 77-2, p. 18, Electrochemical Society.
[b] Activation analysis.
[c] Limits of detection (infrared).

This extremely high degree of purity in respect to silicon is referred to in the industry as "electronic grade" purity. Silicon solar cells can utilize a somewhat lower degree of purity than other semiconductor devices, so-called "solar grade" purity being roughly about 1/100 as pure as electronic grade silicon. That is, solar grade silicon can have roughly 100× the maximum impurity levels noted above for electronic grade silicon. Solar grade purity corresponds to a resistivity of about 1.0 ohm cm or better, whereas electronic grade roughly corresponds to a resistivity of about 100 ohm cm or better.

Silicon of these very high purity levels is currently required in very large quantities; the usage of electronic grade purity silicon alone is in excess of 2500 metric tons annually. The cost of purifying silicon to these extremely high purity levels, in the large quantities needed, has been a major factor—if not, indeed, a major bottleneck—in the industry.

Such exceedingly high levels of purity are required because of the disastrous electronic affects of even low levels of certain impurities. The most critical of these are electronically active impurities, specifically the Group III elements boron and aluminum and the Group V elements phosphorus and arsenic.

Originally elemental silicon was purified to the requisite purity by zone refining of previously formed impure elemental silicon. The elemental silicon used for purification by the zone refining process was generally produced by high temperature and/or hydrogen reduction of a decomposable silicon-containing compound such as $SiCl_4$, $SiHCl_3$, or $SiH_4$. As an incident to the decomposition of the silicon-containing compound, impurities present in the compound codeposit with the silicon formed from the compound and thus appear as impurities in it. The impure silicon is then purified by the zone refining step. For a description of silicon zone refining purification techniques, see "Zone Melting," William G. Pfann, Wiley and Sons, 1958.

Zone refining can produce silicon of very high purity from impure silicon. However, zone refining is a slow and expensive technique, requiring very high power input to produce the moving molten zone. Furthermore, due to the unfavorable segregation coefficient between boron and silicon, boron impurities are not removed from the silicon by zone refining as effectively as other electronically active impurities.

The method which is presently used commercially to produce polycrystalline silicon is based on the purification of trichlorosilane ($SiHCl_3$) by repetitive distillation, followed by decomposition of the purified compound on a hot silicon filament. Trichlorosilane has a boiling point of 33° C., and is commonly purified by vacuum distillation. It is a corrosive compound, which further complicates its purification. The hydrogen reduction of trichlorosilane takes place at a relatively high temperature, which is a disadvantage because of the higher energy required to sustain the chemical reaction. Another disadvantage is that trichlorosilane contains only 20% silicon by weight, so that a relatively large weight of that compound must be processed to obtain a desired weight of silicon.

The primary objective of this invention has been to provide a new and unique process whereby elemental silicon of extremely high purity can be produced on an industrial scale, at a cost competitive with or below that of other available techniques, without need for zone refining or any other purification of the elemental product once formed.

BRIEF DESCRIPTION OF THE INVENTION

A process and apparatus have now been discovered whereby a particular decomposable silicon-containing compound, in relatively impure form, can be purified to an impurity level as low as that of electronic grade silicon, or even purer, and whereby the compound so purified can be decomposed to produce elemental silicon without introducing other impurities and without any other purification procedure. The product can be used for the fabrication of solar cells or semiconductor devices without further purification.

This technique requires silane, $SiH_4$, as the decomposable silicon-containing compound. In carrying out the process of the invention, a silane gas supply of relatively low degree of purity can be used.

The silane gas purification is carried out by automatically injecting the impure gas from the source as a series of spaced pulses into a carrier gas stream which carries them in "plug" flow into a gas chromatographic column, through which the pulses are carried in sequence by an inert carrier gas such as hydrogen. The components of the impure gas feed are retarded to different degrees by the packing as they move through the column, with the result that they exit at different but precisely spaced time intervals in relation to input time.

The packing used in the column is important to the practice of the invention. We have found that a porous polymer packing material is far superior to other packing materials. Packings of the molecular sieve type are also useful, but we have found that they do not display the same "repeatability" of results that characterizes the porous polymers; and they also degrade much more rapidly.

Moreover, we have also found it is especially advantageous to "precondition" the packing by a special heat and gas flow treatment, to achieve the best resolution. This is done by initially baking the packing in the column, preferably at a temperature just below its maximum operating temperature, for a period of at least one hour, then passing a stream of pure silane through the hot packing. Surprisingly, this treatment substantially improves the resolution (peak separation) of the packing, other things being equal.

The column should preferably be operated in the range of about 40° to 90° C. This has been found important to achieve the best separation of impurities in the silane.

The emergence from the column of the silane "peak," i.e., the silane portion of the respective pulse, is detected at the column outlet, or is timed from the pulse input. The silane peak (including admixed carrier gas), when it emerges, is valved (by a valve responsive to the timer or detector) to a receiver, separately from the other gas components which exit before and after it. The silane gas fraction so separated is then thermally decomposed; or it may be collected, pressurized and then be thermally decomposed. The carrier gas is not decomposed and remains gaseous, and is thereby separated. In the preferred practice of the invention the silane valving period is so short as to separate a silane and carrier elute of very high purity (apart from the carrier gas), having an impurity content no higher than that of electronic grade purity. In this case the silicon so produced is of electronic purity, and is suitable for use in fabrication of semiconductor devices or solar cells without further purification such as zone refining. In a modified embodiment the peak valving period is somewhat longer, resulting in separation of a silane and carrier gas elute of lower purity but which when decomposed nevertheless is sufficiently pure to yield silicon of solar grade purity, corresponding to a resistivity of at least 1.0 ohm cm.

THE PRIOR ART

Techniques for purifying silicon-containing compounds are taught in Jacob et al U.S. Pat. No. 3,019,087, and in Shoemaker et al U.S. Pat. No. 3,041,141.

Various other purification techniques are known per se, by which it might be attempted to purify silane gas. These include cryogenic distillation; pressure distillation; solvent extraction in the liquid state; gaseous diffusion; selective absorption (molecular sieve); sublimation; and solid phase zone refining. However, each of those techniques presents serious limitations for ultra high purification of silane.

Large scale gas chromatography is another known purification technique, see "Gas Chromatography-Analysis to Production," Bonmati et al, *Chemical Engineering*, Mar. 24, 1980, pp 70–72. However, as chromatograph column diameter is increased in order to handle the greater throughput needed for production, as distinguished from the small column diameters that are sufficient for analytical separation, flow through the column increasingly departs from ideal plug flow: radial differences in velocity arise, as a result of which the product is less purified than in standard analytical chromatography. These effects become increasingly adverse as column diameter increases. Thus the *Chemical Engineering* article merely indicates that "purities of 99.99% and yields of 98% can be attained." That degree of purity (so-called "four-nines purity") is far short of the ultra high purity required for electronic grade silicon; even solar grade purity is about 1000× higher than the highest purity referred to in the article, and electronic grade is about 100× higher still (of the order of at least nine-nines).

British patent specification No. 871,614 to Cowlard discloses the preparation of silicon by purifying silane in a series of small gas chromatographic columns. The silane component is valved off separately from the impurities and is decomposed to produce silicon having an impurity content said to be not greater than one part per million. Only kieselguhr is disclosed as the column packing material; and the columns are chilled, preferably to a temperature of −60° to −112° C. No column preconditioning treatment is taught; nor is there any teaching of injecting the silane as pulses into any carrier gas.

Gerhold U.S. Pat. No. 3,491,517 shows a continuous chromatographic process for separating a mixture of hydrocarbons such as benzene and hexane.

French Pat. No. 72.064672 discloses a process wherein impure silane containing 100 ppb of diborane ($B_2H_6$) is injected as pulses into a hydrogen stream, then passed through a large scale gas chromatograph column packed with porous granules impregnated with squalene, at 45° C. An effluent is obtained containing 10% silane in hydrogen, with less than 1 ppb of boron impurities. No other packings are taught, and no column preconditioning is taught. Moreover, the reference does not address the removal of other impurity species, most importantly carbon. The squalene packing it teaches is a hydrocarbon of relatively high vapor pressure which itself introduces carbon-containing impurities into the final gas stream.

Thus, until now no technique has been known for obtaining the extremely high degree of silane-gas purification required if subsequent purification of the silicon itself is to be rendered unnecessary.

DESCRIPTION OF THE DRAWINGS

The invention can best be further disclosed by reference to the accompanying drawings, in which.

DETAILED DESCRIPTION

As previously indicated, this invention requires silane gas, $SiH_4$, as the decomposable source of silicon. Use of this particular compound is needed in order to effectively achieve a sufficient purification of the feed so that the silicon produced by decomposition of that purified feed does not itself require further purification.

The silane gas used as the feed can be produced by methods known per se, and the particular technique used to produce it is not part of the invention. See, for example, the several production methods listed in *The*

*Merck Index*, 9th Ed., 1976, pp 1098–1099. The impurity content of the silane feed to the purifying column is not crucial to the invention, however higher purity of the feed leads to more economical ultra purification by the method of this invention. The degree of purity of the gas feed can be determined by common analytical gas chromatographic methods.

As produced, silane gas normally contains impurities which carry over into elemental silicon upon thermal decomposition of the gas. These impurities most commonly include boron, arsenic and phosphorus-containing compounds such as diborane ($B_2H_6$), arsine ($AsH_3$), and phosphane ($PH_3$) which, like silane, are gases at room temperature.

Figure 1:
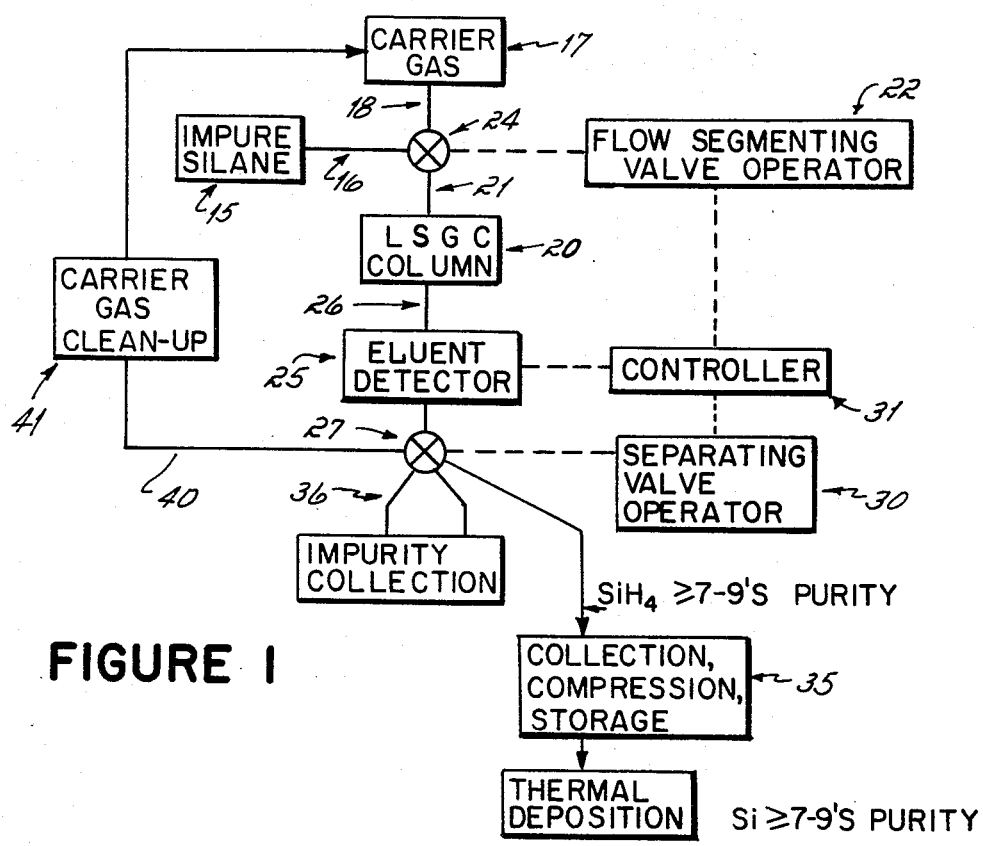
FIG. 1 is a flow diagram in schematic form, illustrating the practice of the process of the invention in accordance with a preferred embodiment.

Referring to FIG. 1, the impure silane gas is supplied from a source 15 at a constant pressure and temperature to a gas supply line 16. Silane boils at $-112°$ C., and thus is a gas at room temperature. Unlike trichlorosilane, it need not be specially vaporized for injection into the chromatograph; and this avoids one factor which would adversely affect the uniformity of purification.

In FIG. 1, a large scale gas chromatographic column ("LSGC") is indicated at 20. By "large scale" is meant that the unit has a column with a diameter greater than 10 mm, and that it is capable of handling large throughputs. The construction of such a column is known per se; see for example the *Chemical Engineering* article previously identified. The column preferably contains at least 500 theoretical gas chromatographic plates.

A pure carrier gas which is inert (i.e., non-decomposable and unreactive) with respect to silane, the column, the packing and the later decomposition step, for example $H_2$, He, $N_2$, or Ar, is supplied from a bottle or other source 17 at a constant pressure and temperature, through a carrier gas supply line 18. Carrier gas sources with electronic impurity contents far less than electronic grade silicon are commercially available. The carrier gas is supplied at the same pressure as the silane. A valve 24 permits a continuous flow of the carrier gas from line 18 to column inlet line 21. Periodically valve 24 is actuated to admit a "pulse" of silane, that is, a constant, predetermined volume from source 15 through line 16 into the flowing carrier gas.

The valve 24 can be operated by a valve operator or timer 22, which in turn automatically energizes a solenoid. Such automatically operated valves are available commercially, for example from Crawford Fittings, Inc.

The silane pulse rate, time duration, and spacing will depend on column size, operating pressure, temperature, packing, and other factors. Injections at the rate of 5 to 20 pulses per minute are believed most useful for volume production; the interval between pulses must be long enough to ensure no cross contamination of the silane component of any one pulse, as it flows through the column, by the impurities of preceding and following pulses, but must be short enough to allow useful throughput of the silane gas. This can readily be determined from the eluent pattern for the pulses.

Figure 2:
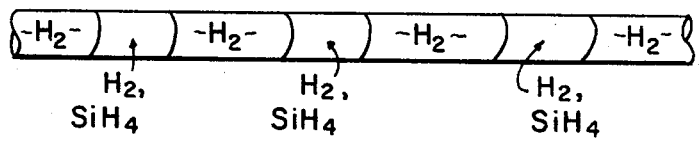
FIG. 2 is a schematic diagram illustrating the segmented flow of the impure silane gas feed through the gas chromatographic column, with hydrogen as the carrier gas.

Because of the pulsed flow, the flow entering column 20 will comprise an interval of carrier gas only, followed by a pulse of silane/carrier mixture, followed again by a carrier gas interval, and so forth. This is shown diagrammatically in FIG. 2.

The column contains a special packing which effectively separates the silane from the impurities in the feed pulse. As shown hereinafter, we have found that surprisingly good results are obtained by using a specially preconditioned packing which is of either the porous polymer type or the molecular sieve type. A preferred form of packing is "Poropak QS," a styrene-divinyl benzene porous polymer packing material made by Waters Associates of Milford, Mass. The packing differentially retards the various gas components as they flow through the column. For the Poropak column material, $B_2H_6$ if present is typically retarded least; it emerges first, followed by $SiH_4$, then $PH_3$ and $AsH_3$.

In order to maximize throughput, it is desirable that the peaks be no further apart than necessary for separation. Other things remaining constant, squeezing the peaks closer together is accomplished by making the injected samples larger; however, for high purity it is desirable to have the peaks well separated, sufficiently to permit the desired "peak cutting" or valving, to be described. The operation of the column is thus a compromise between these two requirements.

Changes in the elute can be sensed, as is known, by use of a thermal conductivity sensor 25, having a detector in outlet line 26. Such detectors are well known, see "Modern Methods of Chemical Analysis," Pecsok and Shields, John Wiley and Sons, 1968, p.75. As the components elute discretely, the conductivity of the gas changes (see FIG. 3). The pulse injections are spaced so that no measurable impurities will overlap the purified silane pulses as they emerge from the column.

Column outlet line 26 contains a separating valve generally designated at 27, having a valve operator 30 which is responsive to a solenoid. Separating valve 27 is operable to direct the outlet gas from line 26 to any of two or more separate outlets. In the preferred embodiment shown, valve 27 is operated by the separating valve operator 30 to direct the silane (and admixed carrier) component when it reaches the valve, to a silane collector 35. The other impurities are directed through lines 36 to separate collectors. The carrier gas (i.e., the flow other than the silane peak and the impurity peaks) is directed to a hydrogen recycle line 40 which contains a conventional hydrogen purification device 41.

Figure 3:
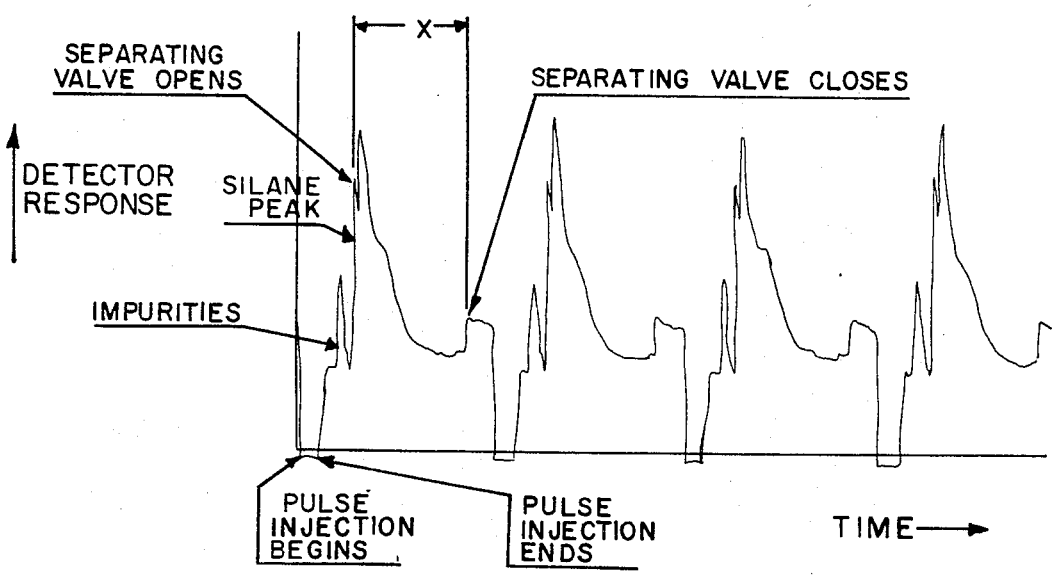
FIG. 3 is a graphical representation showing the cyclical time variation of eluent detector response.

In FIG. 3, the time variation in the conductivity detector signal over a series of pulses appears substantially as it would occur in high throughput practice of the invention. The injection of a sample is manifested as a drop in the signal; the sample is preferably at a slightly higher pressure than the carrier gas, resulting in a pressure wave and higher elution (lower conductivity). After the injection pulse ends (i.e., after valve 24 is closed), an impurities peak appears, signifying emergence of the leading impurities ("leading impurities" are those which elute before the silane). As the silane peak rises, the separating valve 27 is operated to direct the silane to silane collection or thermal decomposition. The silane peak decays more slowly than it rises, and valve 27 remains open during the time period indicated by X, corresponding to the passage of the silane peak through valve 27. The valve is closed before trailing impurities elute. For highest throughput it is desirable to time the injection of the pulses so that the leading impurities of a following pulse elute at about the same time as the trailing impurities of the preceding pulse. This enables the time spacing between silane peaks to be minimized. As the impurities elute, valve 27 is actuated by operator 30 to direct them to the impurity outlets 36. If desired the column can be operated so that the impurities are valved to separate collectors. These purified impurities may have sufficient value that their separate collection is economically attractive.

Between the elution of the components of the respective pulses, the carrier gas elutes continuously from the column. As indicated, separating valve 27 is desirably operated to direct the carrier (e.g., hydrogen) through a carrier recycle line 40, back to carrier gas source 17.

Separating valve operator 30 is preferably responsive to a detector 25 which responds to the elution of a component at a particular time interval after injection of the respective pulse. For this purpose a controller 31 (which may be a timer) establishes an appropriate time window within which the silane elutes; when, within this window, detector 25 detects a sharp change in thermal conductivity, it signals valve operator 30 to open the valve to direct the silane to receiver 35. Alternatively, if the gas chromatographic parameters are sufficiently well controlled, valve operator 30 may be triggered solely by a timer at 31. Timers and detectors suitable for such use are known per se, and do not comprise the invention.

Other things remaining constant, the purity of the silane collected will depend upon the relative period during which valve 27 directs the output gas to receiver 35, in comparison to the duration of the actual silane peak. In other words, the shorter the period of time during which the silane is directed to the receiver, in relation to the width of the silane peak, the more precise the separation will be; but correspondingly, the smaller the yield of purified silane will be. This factor ultimately controls the purity of the final product silicon. From what has been said, it will be seen that preferably the impurity concentrations of the admixed silane and carrier peak should not exceed the impurity levels of electronic grade silicon set forth previously. If, at given gas purification conditions the resistivity of the silicon product is, say, 100 ohm cms, its purity can be increased by decreasing the period of time in which the silane gas component is directed to the receiver.

The precision of the chromatographic separation diminishes with increasing pressure. It is normally desirable to operate the column at the lowest practical positive pressure to obtain efficient utilization of the chromatographic column.

As indicated earlier, the nature and preconditioning of the packing material employed in the column are important aspects of the invention. The suitability of many materials was tested; the majority of them either irreversibly retained silane (apparently by absorption or by reaction with the packing), or they did not retard the passage of the silane differently from that of other admixed components; that is, they did not separate it.

In the packing tests, various packing materials were tested by injecting a sample of silane in argon into a column containing the packing, at various temperatures throughout the operating range of the material. The results indicated whether the silane failed to elute; or eluted with the admixed gas (i.e., was not separated); or eluted separately from the admixed gas (i.e., was separated). If silane was not retained differentially from the gas, the likelihood was that the packing would not successfully remove the electronically active impurities from the silane. The results of the packing tests are shown in the following table:

TABLE II

| Packing | Silane Separation Data | |
|---|---|---|
| | Type | Results |
| Apiezon L | silicone oil | No silane elution |
| Poropak QS | styrene-divinyl benzene porous polymer | Silane separation |
| Poropak N | non-polar styrene-DVB porous polymer | " |
| Squalene | long chain hydrocarbon | No silane separation |
| FFAP | high molecular weight ester | " |
| DEGS | high molecular weight ester | " |
| Carbowax 20M | long chain paraffin | No silane elution |
| Kel-F Wax | fluorocarbon | No silane separation |
| Carbowax 600 | long chain paraffin | No silane elution |
| SP-2250 | silicon gum rubber | " |
| 1% Versamid 940 on Poropak QS | aramid | Silane separation |
| Didecyl Phthalate | high molecular weight | No silane separation |
| 10% Versamid 940 | Aramid | " |
| 13X Mol Sieve | Molecular sieve | Silane separation |
| Poropak PS | Porous polymer | " |
| Carbopack C | graphitized carbon | " |
| Carbosieve B | " | No silane separation |
| 5A Mol Sieve | Molecular sieve | Silane separation |

As can be seen, the only packings which separated the silane from the admixed gas were either of the porous polymer type, or of the molecular sieve type; the others did not achieve even this fundamental type of separation. As between these two categories, further tests established that the molecular sieve packing materials are extremely sensitive to destruction by halide-type impurities such as chlorosilane and will degrade much more rapidly in use than the porous polymers.

Figure 4A:
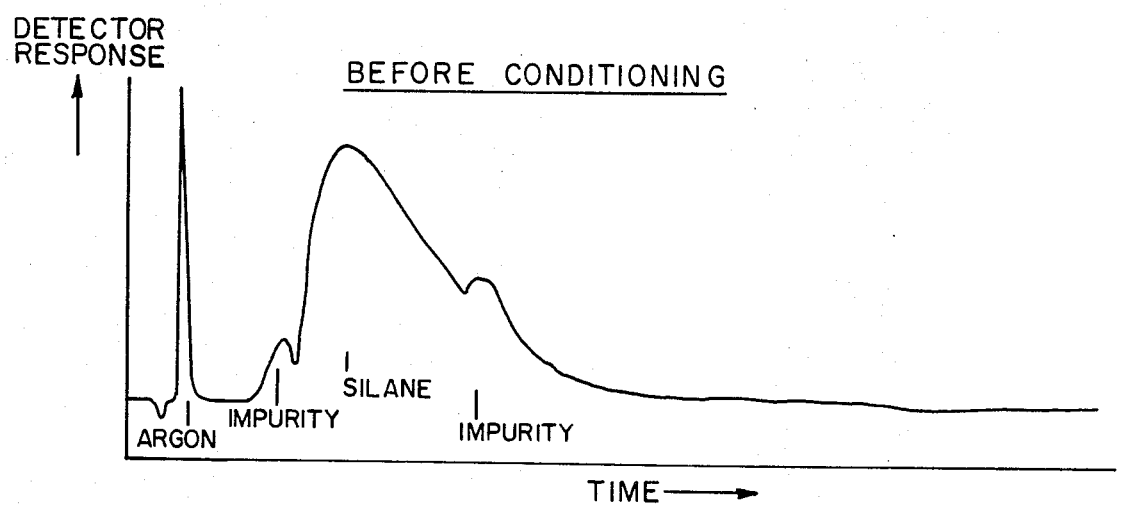
FIG. 4 is a graphical comparison showing the improvement in separation resulting from preconditioning treatment of the column in accordance with the invention.
Figure 4B:
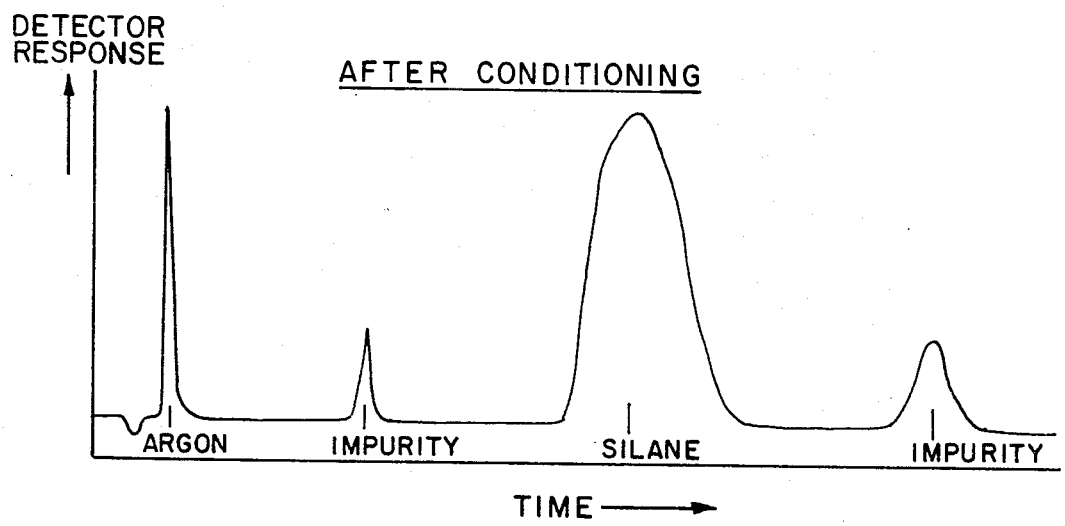

Apart from the nature of the packing material, it is also apparently critical that the packed column be preconditioned, prior to use, in order to achieve the best reduction of "tailing" of silane elution. This preconditioning is done by baking the packed column, preferably at a temperature approximately 10°-30° C. below the maximum operating temperature of the packing, for a period of at least one and preferably two hours or more. By maximum "operating temperature" is meant the temperature which if exceeded in use will cause permanent damage to the packing. For the Poropak series of materials, the maximum operating temperature is between about 210° and 250° C. Preferably such columns are preconditioned by holding them at a preferred baking temperature of 190°-210° C. Then, while holding the column at the baking temperature, the sample gas (silane) is passed through the column for about one-half hour. The precise chemical affect of such preconditioning of the packing is not known, but it is believed that this treatment "fills" (and thereby deactivates) sites in the packing which otherwise would react with or absorb the silane, and hence stop or at least slow its passage through the column. Whatever the reason, a packed column which has not been thus preconditioned exhibits several defects in comparison to one which has been preconditioned. With a column which has not been preconditioned, (1) the silane peak emerges over a longer period, or tails out, that is, the tail of the silane peak overlaps an impurity peak, and thus good separation is not achieved;

(2) the retention time of the silane is relatively short, so that the time spacing between sequential peaks is undesirably short; and (3) the impurities are not separated as well. FIG. 4 shows a comparison (on a slow time scale) between the elution of an unconditioned column (FIG. 4A) with that of a preconditioned column (FIG. 4B).

After preconditioning, the temperature is reduced for operation, preferably to about 75° C.

Once separated, the purified silane can be thermally decomposed by techniques known per se, for example, by a heated filament free space reactor, a fluidized bed, etc. The decomposition technique which is especially useful and which is preferred because it minimizes the introduction of the impurities during decomposition, is that of decomposing the gas in a fluidized bed of fine silicon particles. Apparatus which can be used for this type of thermal decomposition is taught in DOE/JPL Final Report, Contract No. 954334, dated June 1979, the disclosure of which is incorporated by reference. In that technique, the bed on which the silane is decomposed itself must comprise silicon "beads" previously formed. The silicon particles act as a heat transfer medium to decompose the gas, which deposit additional layers of silicon on the particles. In this decomposition, the inert carrier gas is not decomposed, remains gaseous, and is thereby separated from the solid silicon. (In any event the carrier atoms do not constitute an electronically active impurity in the product silicon itself.)

Silane is uniquely suited for purification to an ultra high degree by large scale gas chromatography. Moreover, because it is a gas, it can be injected into the carrier gas stream at reproducible, uniform flow rates, without the irregularities that would accompany vaporization of a solid or liquid. A solid column packing, and a method of conditioning it, has been found by which high purification can be achieved simultaneously with useful throughput rates. Moreover, the purified gas can be converted to solid silicon pyrolytically, directly following elution from the purification step, which avoids cryogenic trapping that is often required in order to collect other gaseous outputs.

Having described the invention, what is claimed is:

1. In the production of elemental silicon by decomposition of silane,
the improvement comprising,
providing a gas chromatograph column having a packing selected from the group consisting of porous polymer and molecular sieve column packing materials and which differentially retards the flow through it of silane gas in comparison to the flow of undesirable impurities contained in said gas,
preconditioning said packing by heating the column and packing therein for a period of at least one hour at a temperature about 10°–30° C. below the maximum operating temperature of the packing, then flowing a stream of silane gas over the packing so heated for a period of at least about one-half hour, the column so conditioned providing substantially better separation of silane from impurities than a corresponding column which is not so preconditioned,
providing a silane gas feed containing undesirable impurities of the electronically active type,
injecting said feed as a series of regularly spaced pulses into a stream of an inert carrier gas,
passing the resulting stream through said column, the packing therein differentially retarding the silane gas component of each respective pulse so that it elutes from the column as a silane peak at a different time than the said impurities,
operating a valve to direct the silane peak of each respective pulse to a separate outlet line from the impurities, said valve being opened only during elution of the silane peak, for so brief a period that the purity of the valved silane and admixed carrier gas is no less than that of electronic grade silicon, and
decomposing the thus separated silane, in the presence of the carrier gas, to produce elemental silicon of at least electronic grade purity.

2. The process of claim 1 wherein the packing is a porous polymer.

3. The process of claim 1 wherein the column is operated at a temperature in the range of about 40° to 90° C.

4. The process of claim 1 wherein the separated silane and admixed carrier gas contain no more than the following impurities:

| Purity | Total Parts Per Billion Atomic |
| --- | --- |
| Group III elements | 0.3 |
| Group V elements | 1.5 |
| Heavy metals | 0.1 |
| Carbon | 300 |
| Oxygen | 50 |
| All others | 0.001 |

5. The process of claim 1 wherein the silane feed contains impurities of the group $AsX_3$, $BX_3$, $SiHX_3$, $SiH_3X$, and $PX_3$ where X is a halogen.

6. The process of claim 1 wherein the silane feed contains one or more gaseous compounds of the group $AsH_3$, $B_2H_6$, and $PH_3$.

7. The process of claim 1 wherein the carrier gas flows continuously through the column and wherein the silane gas is admitted to the carrier gas stream as square wave pulses separated from start to start by an interval such that trailing impurities, eluted after the silane peak of a first pulse, are eluted at substantially the same time as the leading impurities of a second pulse.

8. The process of claim 1 wherein said valve is open only for a central portion of the silane peak.

9. The process of claim 1 wherein no step of purifying said elemental silicon is present.

10. In the production of elemental silicon by decomposition of silane,
the improvement comprising,
providing a silane gas feed containing undesirable impurities,
providing a gas chromatograph column having a packing selected from the group consisting of porous polymer and molecular sieve column packing materials and which differentially retards the flow through it of the silane gas in said gas feed,
preconditioning said packing by heating the column and packing therein for a period of at least one hour at a temperature about 10°–30° C. below the maximum operating temperature of the packing, then flowing a stream of silane gas over the packing so heated for a period of at least about one-half hour, the column so conditioned providing substantially better separation of silane from impurities than a corresponding column which is not so preconditioned, injecting said feed as a series of regularly spaced pulses into a stream of an inert carrier gas, passing the resulting stream through said column so that the silane gas component of each respective pulse elutes from the column at a different time than the said impurities, impurities contained in one pulse being eluted at essentially the same time as impurities from an immediately preceding pulse or an immediately following pulse, operating a valve during elution of the silane gas component of each respective pulse to direct the silane gas component of the respective pulse to a separate outlet line from the impurities; said valve being opened during elution of the silane component to direct said silane component and admixed carrier gas only to said outlet line, and decomposing the thus separated purified silane, to produce elemental silicon, without other purification, said elemental silicon having a purity corresponding to a resistivity of at least 1.0 ohm cms.

11. In the production of elemental silicon by decomposition of silane, the improvement comprising, providing a gas chromatograph column having a styrene-divinyl benzene porous polymer packing, preconditioning said packing by heating it in the column for a period of at least one hour at a temperature about 10°–30° C. below the maximum operating temperature of the packing, then flowing a stream of silane gas over the packing so heated for a period of at least about one-half hour, providing a silane gas feed containing undesirable impurities of the electronically active type, injecting said feed as a series of regularly spaced pulses into a stream of an inert carrier gas, passing the resulting stream through said column, the packing therein differentially retarding the silane gas component of each respective pulse so that it elutes from the column as a silane peak at a different time than the said impurities, operating a valve to direct the silane peak of each respective pulse to a separate outlet line from the impurities, said valve being opened only during elution of the silane peak, for so brief a period that the purity of the valved silane and admixed carrier gas is no less than that of electronic grade silicon, and decomposing the thus separated silane, in the presence of the carrier gas, to produce elemental silicon of at least electronic grade purity.

* * * * *